United States Patent
Sabeur et al.

(10) Patent No.: US 12,484,004 B2
(45) Date of Patent: Nov. 25, 2025

(54) INTERNET PROTOCOL MULTIMEDIA SUBSYSTEM (IMS) REGISTRATION IN WIRELESS COMMUNICATION NETWORKS

(71) Applicant: T-MOBILE INNOVATIONS LLC, Overland Park, KS (US)

(72) Inventors: Nassereddine Sabeur, Bellevue, WA (US); Saqib Badar, Bellevue, WA (US); Joel Lee Arends, Renton, WA (US); Jason Cataquis, Bellevue, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 396 days.

(21) Appl. No.: 18/306,806

(22) Filed: Apr. 25, 2023

(65) Prior Publication Data

US 2024/0365270 A1    Oct. 31, 2024

(51) Int. Cl.
  *H04W 8/04*   (2009.01)
  *H04L 65/1016*  (2022.01)
  *H04L 65/1045*  (2022.01)
  *H04W 8/28*   (2009.01)
  *H04W 12/06*   (2021.01)
  *H04W 60/00*   (2009.01)
  *H04W 60/04*   (2009.01)
  *H04W 80/10*   (2009.01)

(52) U.S. Cl.
  CPC ......... *H04W 60/00* (2013.01); *H04L 65/1016* (2013.01); *H04L 65/1045* (2022.05); *H04W 80/10* (2013.01)

(58) Field of Classification Search
  CPC ............. H04L 65/1016; H04L 65/1045; H04L 65/1073; H04W 60/00; H04W 80/10

USPC ...................................................... 455/435.1
See application file for complete search history.

(56) References Cited

U.S. PATENT DOCUMENTS

| 9,705,938 B2 | 7/2017 | Jonescu |
| 11,134,108 B2 | 9/2021 | Qiao et al. |
| 11,178,714 B2 | 11/2021 | Li et al. |
| (Continued) | | |

FOREIGN PATENT DOCUMENTS

WO    2022126146 A1   6/2022

OTHER PUBLICATIONS

IP.com search History (Year: 2025).*

*Primary Examiner* — Moustapha Diaby

(57) ABSTRACT

Various embodiments comprise wireless communication network to register user devices with multimedia systems. In some examples, the wireless communication network comprises multimedia functions and a subscriber server. A first multimedia function receives a registration request for a wireless user device, selects the subscriber server from a plurality of available subscriber servers, and transfers a user authorization request for the user device to the subscriber server. The subscriber server receives the user authorization request and transfers a response indicating a server Identifier (ID) for the subscriber server. The first multimedia function receives the response and indicates the server ID and the registration request to a second multimedia function. The second multimedia function receives the server ID and the registration request, selects the same subscriber server based on the server ID, and transfers a multimedia authorization request to the subscriber server.

20 Claims, 11 Drawing Sheets

(56) References Cited

U.S. PATENT DOCUMENTS

| | | |
|---|---|---|
| 11,395,127 B2 | 7/2022 | Sahin et al. |
| 2016/0248814 A1* | 8/2016 | Mufti .................... H04L 69/24 |
| 2017/0111406 A1* | 4/2017 | Ionescu .............. G06F 11/0793 |
| 2020/0244710 A1* | 7/2020 | Patil ................... H04L 65/1073 |
| 2020/0336976 A1 | 10/2020 | Atarius et al. |
| 2020/0396262 A1* | 12/2020 | Al-Mehdar ........... H04L 61/503 |
| 2021/0176634 A1* | 6/2021 | Badar ................. H04L 65/1066 |
| 2022/0070649 A1* | 3/2022 | Sahin .................. H04L 65/1073 |
| 2025/0016710 A1* | 1/2025 | Verin ................... H04W 60/00 |

* cited by examiner

INTERNET PROTOCOL MULTIMEDIA SUBSYSTEM (IMS) REGISTRATION IN WIRELESS COMMUNICATION NETWORKS

TECHNICAL FIELD

Various embodiments of the present technology relate to Internet Protocol Multimedia Subsystem (IMS), and more specifically, to Call State Control Function (CSCF) registration signaling.

BACKGROUND

Wireless communication networks provide wireless data services to wireless user devices. Exemplary wireless data services include machine-control, internet-access, media-streaming, online gaming, and social-networking. Exemplary wireless user devices comprise phones, computers, vehicles, robots, and sensors. Radio Access Networks (RANs) exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The RANs exchange network signaling and user data with network elements that are often clustered together into wireless network cores over backhaul data links. The core networks execute network functions to provide wireless data services to the wireless user devices.

An Internet Protocol Multimedia Subsystem (IMS) delivers Internet Protocol (IP) multimedia services like voice calling and video conferencing to wireless user devices. The IMS distributes IP addresses to the wireless user devices to facilitate communications between the wireless user devices. The IMS interfaces with wireless network cores to exchange Session Initiation Protocol (SIP) messages with the wireless user devices to communicate with the wireless user devices. The IMS comprises network functions and network elements like Call State Control Function (CSCF), Telephony Application Server (TAS), and Short Message Service Application Server (SMS AS).

The wireless network core transfers network addresses for the IMS to the wireless user device when the wireless user device attaches to the network core over an access node. To be able to use IMS services like voice calling or video conferencing, the user device first registers with the IMS. To register, the user device transfers a registration request to the IMS. The IMS interfaces with subscriber systems in the network core to verify the identity of the user device and confirm that the user device qualifies for IMS service. Exemplary subscriber systems include Home Subscriber Server (HSS) and Unified Data Management (UDM). The registration sequence between the IMS and the subscriber systems relies on precisely timed signaling. When the IMS transfers registration signaling for a user device to different subscriber systems before the requisite amount of time has elapsed, the registration process will fail. When the registration process fails, the user device must restart the registration procedure thereby delaying the delivery of IMS service to the user device.

Unfortunately, wireless communication networks do not efficiently register wireless user devices with IMS. Moreover, the IMS does not effectively associate registration requests in association with subscriber system network addresses.

Overview

This Overview is provided to introduce a selection of concepts in a simplified form that are further described below in the Technical Description. This summary is not intended to identify key features or essential features of the claimed subject matter, nor is it intended to be used as an aid in determining the scope of the claimed subject matter.

Various embodiments of the present technology relate to solutions to inhibit multimedia system registration failure for wireless user devices. Some embodiments comprise a method of operating a wireless communication network to register user devices with a multimedia system. The method comprises a first multimedia function receiving a registration request for a wireless user device, selecting a subscriber server from a plurality of available subscriber servers, and transferring a user authorization request for the wireless user device to the subscriber server. The method further comprises the subscriber server receiving the user authorization request and transferring a response indicating a server Identifier (ID) for the subscriber server to the first multimedia function. The method further comprises the first multimedia function receiving the response and indicating the registration request and the server ID to a second multimedia function. The method further comprises the second multimedia function receiving the registration request and the server ID, selecting the subscriber server of the plurality of available subscriber servers based on the server ID, and transferring a multimedia authorization request to the subscriber server.

Some embodiments comprise a wireless communication network configured to register wireless user devices with a multimedia system. The wireless communication network comprises multimedia functions and a subscriber server. The first multimedia function receives a registration request for a wireless user device, selects a subscriber server from a plurality of available subscriber servers, and transfers a user authorization request for the wireless user device to the subscriber server. The subscriber server receives the user authorization request and transfers a response indicating a server ID for the subscriber server to the first multimedia function. The first multimedia function receives the response and indicates the registration request and the server ID to a second multimedia function. The second multimedia function receives the registration request and the server ID, selects the subscriber server of the plurality of available subscriber servers based on the server ID, and transfers a multimedia authorization request to the subscriber server.

Some embodiments comprise a method of operating a wireless communication network to register user devices with an Internet Protocol Multimedia Subsystem (IMS) core. The method comprises an Interrogating Call State Control Function (I-CSCF) receiving a registration request for a wireless user device from a Proxy Call State Control Function (P-CSCF) and transferring a user authorization request for the wireless user device to a Unified Data Management (UDM) of a plurality of available UDMs. The method further comprises the UDM receiving the user authorization request and transferring a user authorization answer comprising a network address for the UDM and Serving Call State Control Functions (S-CSCFs) data indicating available S-CSCFs to the I-CSCF. The method further comprises the I-CSCF receiving the user authorization answer, selecting an S-CSCF of the available S-CSCFs, and forwarding the registration request and the network address to the S-CSCF. The method further comprises the S-CSCF receiving the registration request and the network address, selecting the UDM of the plurality of available UDMs based on the network address, and transferring a multimedia authorization request to the UDM.

DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

Figure 1:
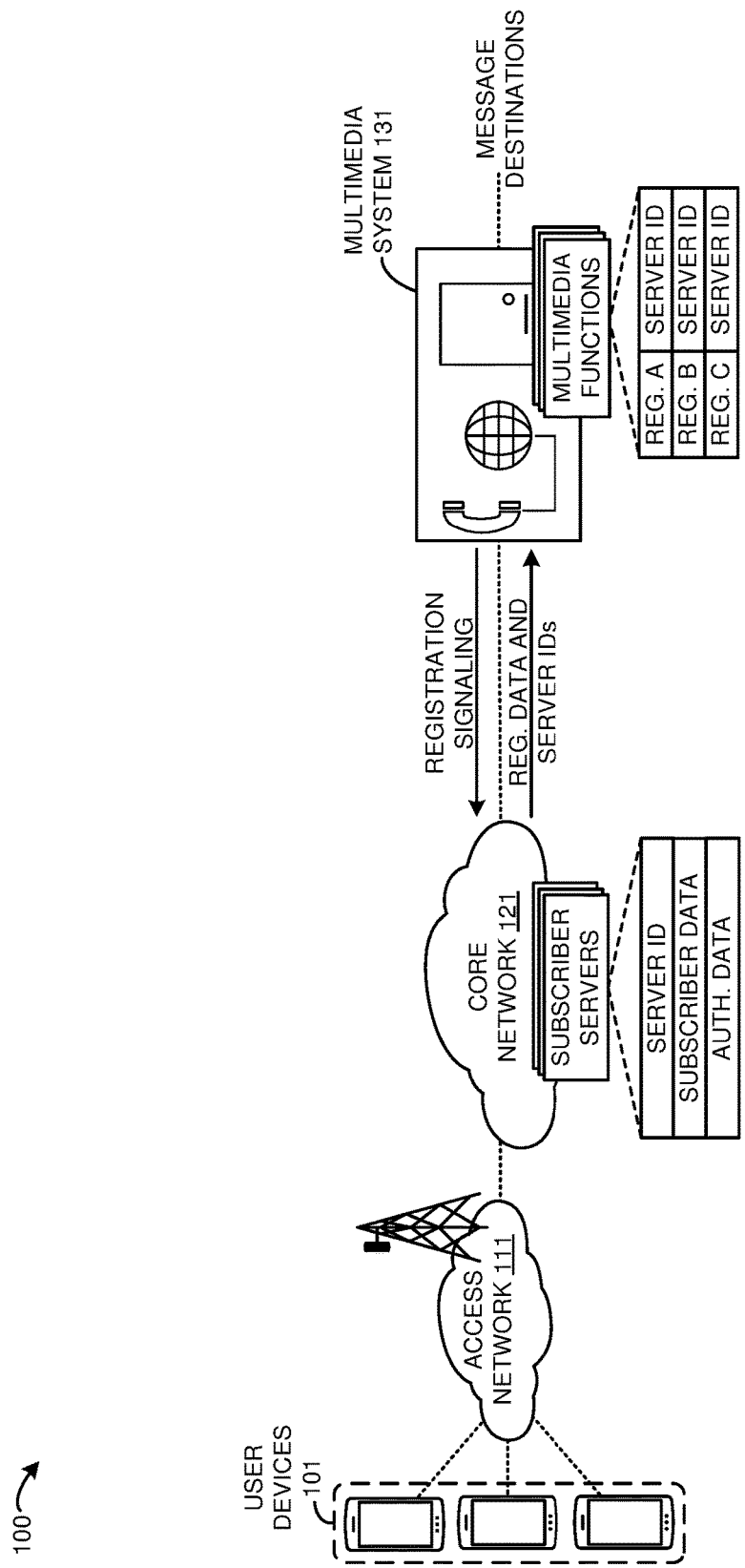
FIG. 1 illustrates a wireless communication network to register user devices with a multimedia system.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

Technical Description

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

FIG. 1 illustrates wireless communication network 100 network to register wireless user devices with a multimedia system. Wireless communication network 100 delivers services like machine communications, internet-access, media-streaming, or some other wireless communications product to user devices. Wireless communication network 100 comprises user devices 101, access network 111, core network 121, and multimedia system 131. In other examples, wireless network communication network 100 may comprise additional or different elements than those illustrated in FIG. 1.

Various examples of network operation and configuration are described herein. In some examples, multimedia system 131 receives a request for one of user devices 101 to register with multimedia system 131. In response to the registration request, a multimedia function in multimedia system 131 selects a subscriber server from a set of available subscriber servers in core network 121. The subscriber servers may comprise Home Subscriber Servers (HSSs), Unified Data Managements (UDMs), and/or another type of computing system in core network 121 that maintains user information associated with user devices 101. The multimedia function transfers a user authorization request for the one of user devices 101 to the selected subscriber server. The subscriber server transfers a response to the multimedia function that indicates a server identifier (ID). The server ID comprises a code that uniquely identifies the selected subscriber server from the set of available subscriber servers. For example, the server ID may comprise a network address or origin host Address Value Pair (AVP) for the server. The multimedia function receives the response from the subscriber server and forwards the registration request and server ID to a second multimedia function to continue the registration process. The second multimedia function selects the same subscriber server from the set of available subscriber servers based on the server ID. The second multimedia function transfers a multimedia authorization request to the subscriber server.

Wireless communication network 100 provides wireless data services to user devices 101. Exemplary user devices include phones, computers, vehicles, robots, and sensors. Access network 111 exchanges wireless signals with user devices 101 over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). Access network 111 is connected to core network 121 over backhaul data links. Access network 111 exchanges network signaling and user data with network elements in core network 121. Access network 111 may comprise wireless access points, Radio Access Networks (RANs), internet backbone providers, edge computing systems, or other types of wireless/wireline access systems to provide wireless/wireline links to user devices 101, the backhaul data links, and edge computing services between user devices 101 and core network 121.

Access network 111 may comprise Radio Units (RUs), Distributed Units (DUs) and Centralized Units (CUs). The RUs may be mounted at elevation and have antennas, modulators, signal processors, and the like. The RUs are connected to the DUs which are usually nearby network computers. The DUs handle lower wireless network layers like the Physical Layer (PHY), Media Access Control (MAC), and Radio Link Control (RLC). The DUs are connected to the CUs which are larger computer centers that are closer to core network 121. The CUS handle higher wireless network layers like the Radio Resource Control (RRC), Service Data Adaption Protocol (SDAP), and Packet Data Convergence Protocol (PDCP). The CUs are coupled to network functions in core network 121.

Core network 121 and multimedia system 131 are representative of computing systems that provide wireless data services to user devices 101 over access network 111. Exemplary computing systems comprise data centers, cloud computing networks, and the like. The computing systems of core network 121 store and execute the network functions to provide wireless data services to user devices 101 over access network 111. Exemplary network functions include Access and Mobility Management Function (AMF), Session Management Function (SMF), and User Plane Function (UPF). Core network 121 comprises a set of subscriber servers that store subscriber profiles for user devices 101. The subscriber profiles comprise information like user Identifies (ID), subscription data, server attributes, Quality-of-Server (QoS), and the like. Core network 121 may comprise a Fifth Generation Core (5GC) architecture and/or an Evolved Packet Core (EPC) architecture.

The computing systems of multimedia system 131 store and execute multimedia functions to provide services like voice calling, video conferencing, and text messaging to user devices 101. In response to registration requests received from user devices 101, the multimedia functions interface with the subscriber servers in core network 121 to register user devices 101 for multimedia services. The multimedia functions associate server IDs received from core network 121 with the registration requests to ensure registration related signaling for a single user device is routed to the same subscriber server to inhibit registration failure. As illustrated in FIG. 1, registration request (REG.) A is associated with a server ID, registration request B is associated with a server ID, and registration request C is associated with a server ID. Exemplary multimedia functions include Call State Control Function (CSCF), Telephony Application Server, and Short Message Service Application Server (SMS AS). Multimedia system 131 may comprise an Internet Protocol Multimedia Subsystem (IMS) core architecture. For example, multimedia system 131 may receive text messages or voice call requests sent by user devices 101 and route the text messages and voice call requests to their respective the message destinations.

Figure 2:
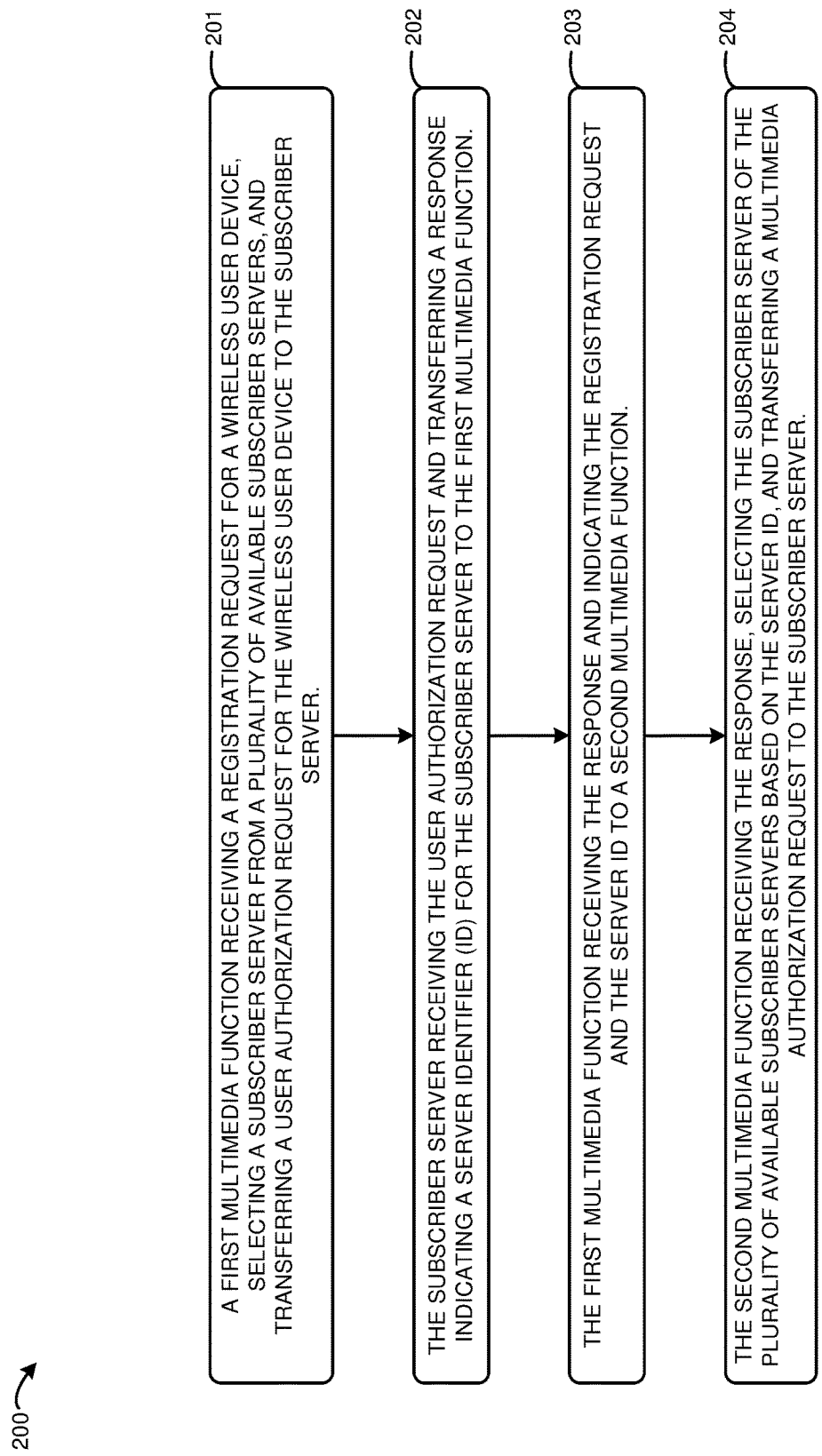
FIG. 2 illustrates an exemplary operation of the wireless communication network to register user devices with the multimedia system.

FIG. 2 illustrates process 200. Process 200 comprises an exemplary operation of wireless communication network 100 to register wireless user devices with a multimedia system. The operation may vary in other examples. The operations of process 200 comprise a first multimedia function receiving a registration request for a wireless user device, selecting a subscriber server from a plurality of available subscriber servers, and transferring a user authorization request for the wireless user device to the subscriber server (step 201). The operations further comprise the subscriber server receiving the user authorization request and transferring a response indicating a server ID for the subscriber server to the first multimedia function (step 202). The operations further comprise the first multimedia function receiving the response and indicating the registration request and the server ID to a second multimedia function (step 203). The operations further comprise the second multimedia function receiving the response, selecting the subscriber server of the plurality of available subscriber servers based on the server ID, and transferring a multimedia authorization request to the subscriber server (step 204).

Figure 3:
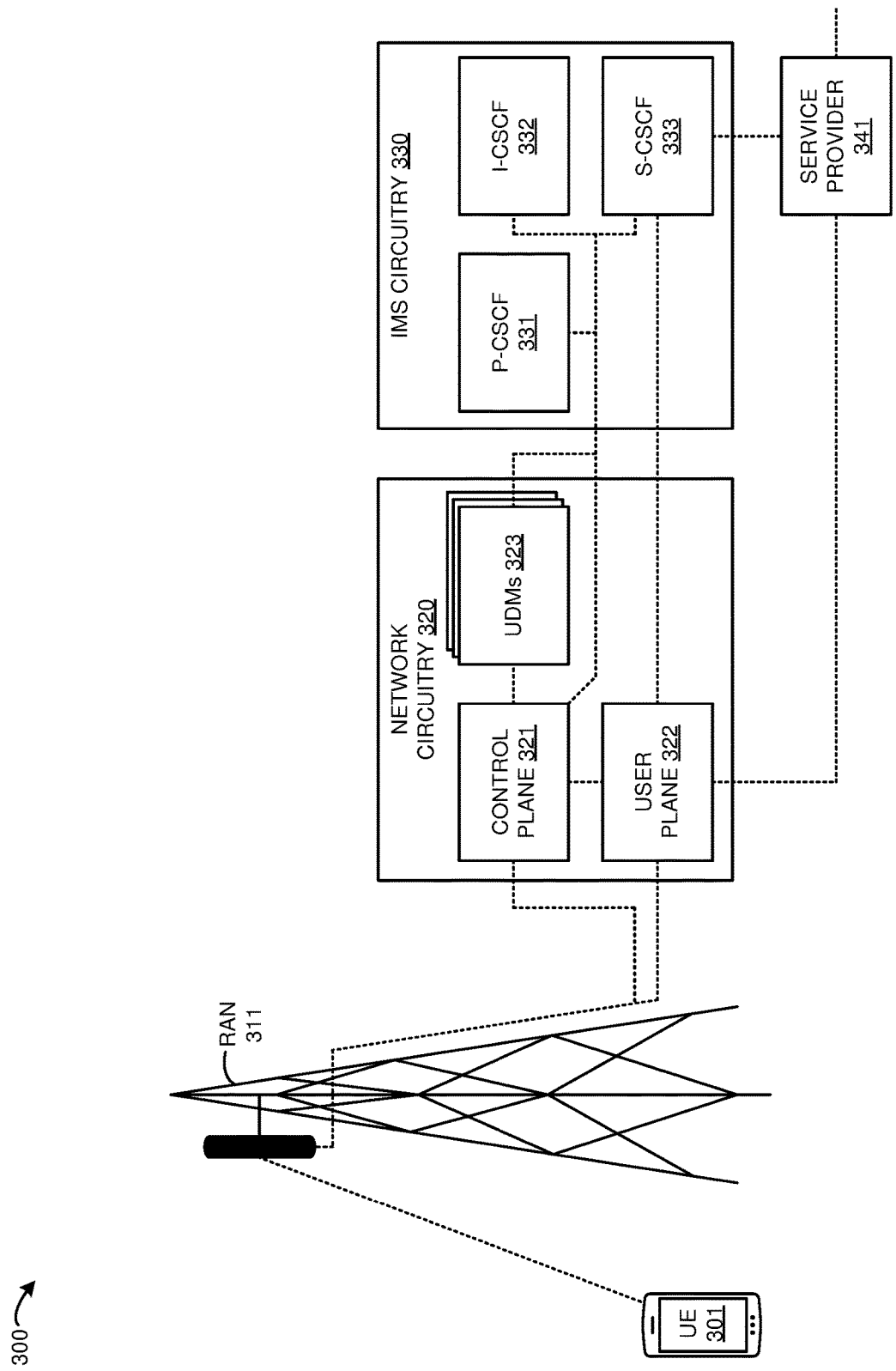
FIG. 3 illustrates a wireless communication network to register a wireless User Equipment (UE) with an Internet Protocol Multimedia Subsystem (IMS).

FIG. 3 illustrates wireless communication network 300 to register wireless User Equipment (UE) with an IMS system. Wireless communication network 300 is an example of wireless network 100, however network 100 may differ. Wireless communication network 300 comprises UE 301, RAN 311, network circuitry 320, IMS circuitry 330, and service provider 341. Network circuitry 320 comprises control plane 321, user plane 322, and UDMs 323. IMS circuitry 330 comprises Proxy Call State Control Function (P-CSCF) 331, Interrogating Call State Control Function (I-CSCF) 332, and Serving Call State Control Function (S-CSCF) 333. In other examples, wireless network 300 may comprise additional or different elements than those illustrated in FIG. 3.

In some examples, UE 301 attaches to network circuitry 320 over RAN 311. UE 301 generates and transfers a multimedia registration request for delivery to control plane 321. The registration request may comprise user identification information for IMS circuitry to identify and authenticate UE 301. Control plane 321 forwards the registration request to P-CSCF 331. P-CSCF 331 identifies and forwards the registration request to I-CSCF 332. P-CSFC 331 may query a Domain Name System (DNS) or some other type of network address repository to identify I-CSCF 332. I-CSCF receives the registration request for UE 301 and responsively transfers a User Authorization Request (UAR) to one of UDMs 323. The UDM of UDMs 323 that received the UAR determines a set of available S-CSCFs and responsively transfers a User Authorization Answer (UAA) indicating the available S-CSCFs and the origin host AVP for the selected UDM. I-CSCF 332 selects S-CSCF 333 based on the UAA and forwards the registration request and origin host AVP to S-CSCF 333. For example, I-CSCF 332 may insert the origin host AVP into a message header of the registration request and forward the modified registration request to S-CSCF 333. S-CSCF 333 selects the same UDM used by I-CSCF 333 based on the origin host AVP. S-CSCF 333 transfers a Multimedia Authorization Request (MAR) to the selected UDM to continue the IMS registration procedure for UE 301. Once registered, UE 301 may initiate an IMS session (e.g., a voice call) and exchange user data with service provider 341 over RAN 311 and user plane 322. IMS circuitry 330 provides network address and interfaces with user plane 322 and service provider 341 to establish and support the IMS session.

Advantageously, wireless communication network 300 efficiently registers UE 301 with IMS circuitry 330. Moreover, the IMS circuitry 330 effectively associates the registration request for UE 301 with a network address for the selected one of UDMs 323 thereby inhibiting registration failure and increasing the reliability of the IMS registration procedure.

UE 301 and RAN 311 communicate over links using wireless/wired technologies like 5GNR, LTE, LP-WAN, WIFI, Bluetooth, and/or some other type of wireless or wireline networking protocol. The wireless technologies use electromagnetic frequencies in the low-band, mid-band, high-band, or some other portion of the electromagnetic spectrum. The wired connections comprise metallic links, glass fibers, and/or some other type of wired interface. RAN 311, network circuitry 320, IMS circuitry 330, and service provider 341 communicate over various links that use metallic links, glass fibers, radio channels, or some other communication media. The links use Fifth Generation Core (5GC), IEEE 802.3 (ENET), Time Division Multiplex (TDM), Data Over Cable System Interface Specification (DOCSIS), Internet Protocol (IP), General Packet Radio Service Transfer Protocol (GTP), 5GNR, LTE, WIFI, virtual switching, inter-processor communication, bus interfaces, and/or some other data communication protocols.

UE 301 may comprise a phone, vehicle, computer, sensor, drone, robot, or another type of data appliances with wireless and/or wireline communication circuitry. Although RAN 311 is illustrated as a tower, RAN 311 may comprise another type of mounting structure (e.g., a building), or no mounting structure at all. RAN 311 comprises a Fifth Generation (5G) RAN, LTE RAN, gNodeB, eNodeB, NB-IoT access node, LP-WAN base station, wireless relay, WIFI hotspot, Bluetooth access node, and/or another wireless or wireline network transceiver. UE 301 and RAN 311 comprise antennas, amplifiers, filters, modulation, analog/digital interfaces, microprocessors, software, memories, transceivers, bus circuitry, and the like. Control plane 321 comprises network functions like AMF, SMF, and the like. User plane 322 comprises network functions like UPF, edge UPF, and the like. Although network circuitry 320 is illustrated comprising UDMs 323, in some examples UDMs 323 may be replaced by or used in addition with a set of HSSs. Service provider 341 is representative of a data endpoint that provides a multimedia service for UE 301 like an Application Server (AS). In some examples, service provider 341 may comprise a proxy system to facilitate communications between UE 301 and another UE. For example, service provider may comprise another IMS circuitry associated with another wireless communication network.

UE 301, RAN 311, network circuitry 320, IMS circuitry 330, and service provider 341 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), Field Programmable Gate Array (FPGA), and/or the like. The memories comprise Random Access Memory (RAM), flash circuitry, Solid State Drives (SSD), Non-Volatile Memory Express (NVMe) SSDs, Hard Disk Drives (HDDs), and/or the like. The memories store software like operating systems, user applications, radio applications, network functions, and multimedia functions. The microprocessors retrieve the software from the memories and execute the software to drive the operation of wireless communication network 300 as described herein.

Figure 4:
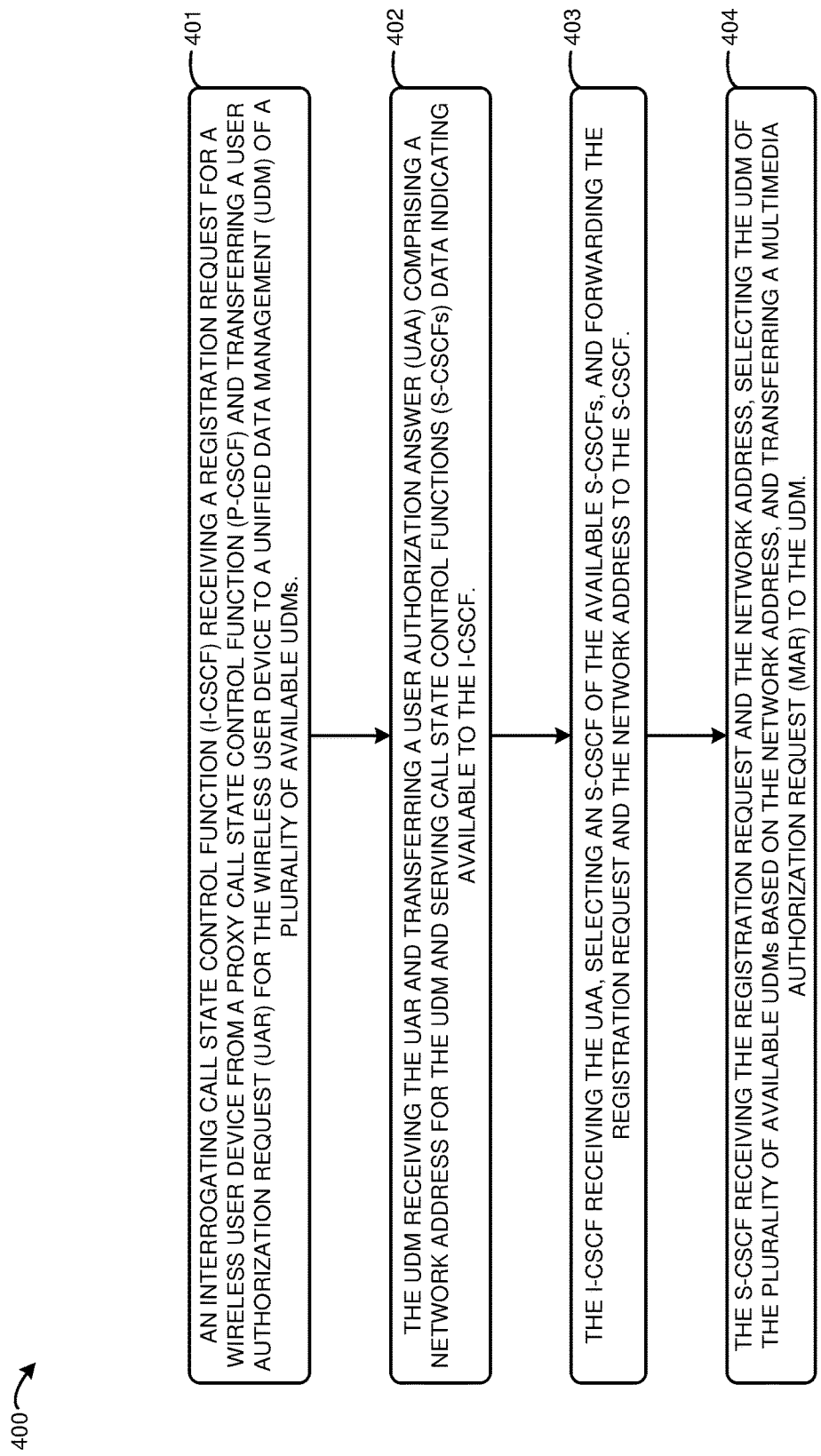
FIG. 4 illustrates an exemplary operation of the wireless communication network to register the UE with the IMS.

FIG. 4 illustrates process 400. Process 400 comprises an exemplary operation of wireless communication network 300 to register a UE with an IMS. The operation may vary in other examples. The operations of process 400 comprise an I-CSCF receiving a registration request for a wireless user device from a P-CSCF and transferring a UAR for the wireless user device to a UDM of a plurality of UDMs (step 401). The operations further comprise the UDM receiving the user authorization request and transferring a UAA comprising a network address for the UDM and S-CSCF data indicating available S-CSCFs to the I-CSCF (step 402). The operations further comprise the I-CSCF receiving the UAA, selecting an S-CSCF of the available S-CSCFs, and forwarding the registration request and the network address to the S-CSCF (step 403). The operations further comprise the S-CSCF receiving the registration request and the network address, selecting the UDM of the plurality of available UDMs based on the network address, and transferring an MAR to the UDM (step 404).

Figure 5:
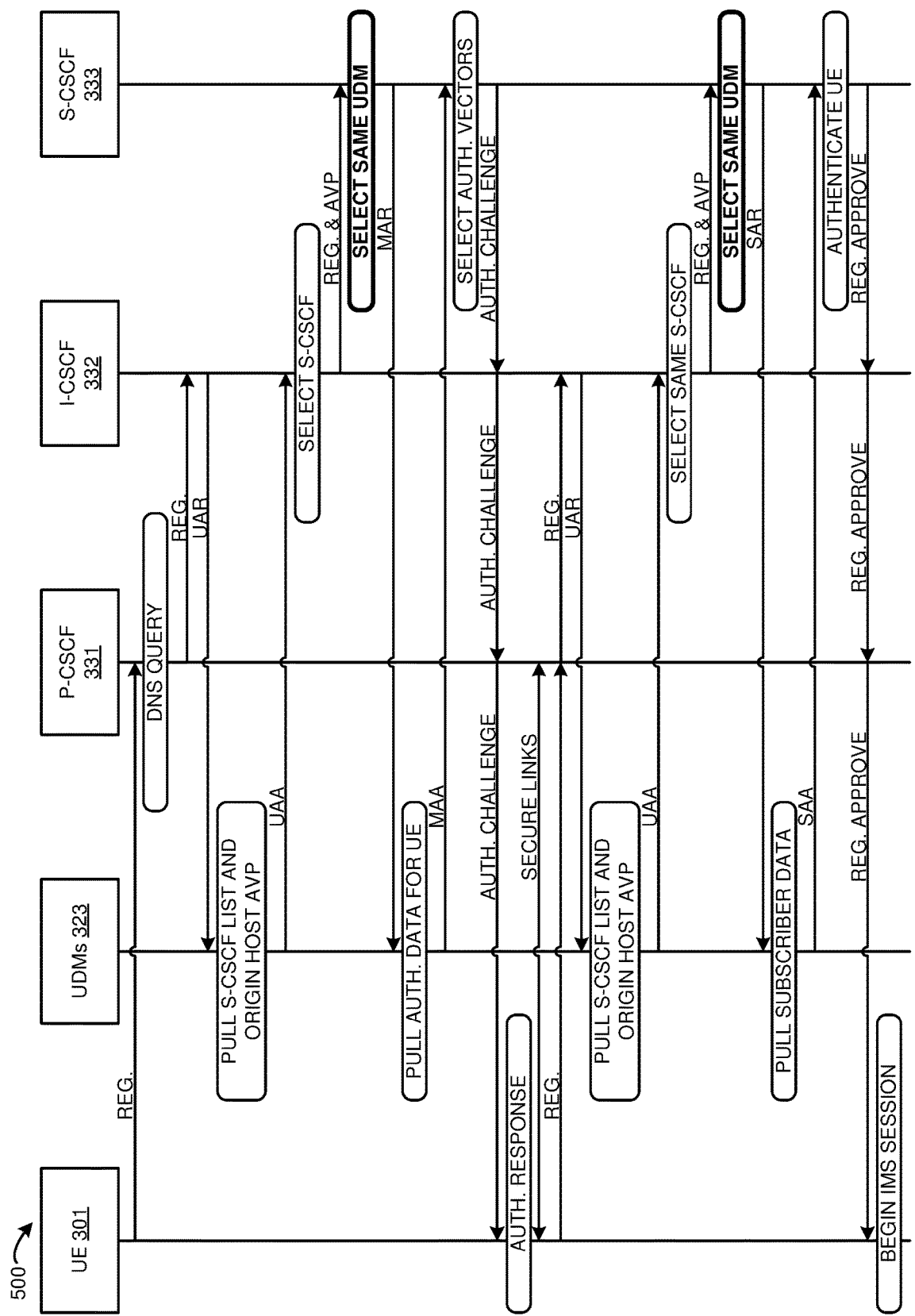
FIG. 5 illustrates an exemplary operation of the wireless communication network to register the UE with the IMS.

FIG. 5 illustrates process 500. Process 500 comprises an exemplary operation of wireless communication network 300 to a UE with an IMS. The operation may vary in other examples. In operation, UE 301 attaches to network circuitry 320 over RAN 311. UE 301 transfers an IMS registration request (REG.) addressed for P-CSCF 331 to control plane 321. Control plane 321 forwards the registration request to P-CSCF 331. Upon receiving the request, P-CSCF 331 performs a DNS query to retrieve the network address for I-CSCF 332. P-CSCF 331 transfers the registration request to I-CSCF 332 based on the DNS query. I-CSCF generates and transfers a UAR based on the registration request to assign an S-CSCF to one of UDMs 323. The selected UDM determines a set of available S-CSCFs. The UDM transfers a UAA indicating the set of available S-CSCFs and an origin host AVP that uniquely identifies the UDM (e.g., a network address or server ID). I-CSCF 332 selects S-CSCF 333 based on the UAA and inserts the origin host AVP for the selected UDM into a message header of the registration request. I-CSCF 332 forwards the modified registration request to S-CSCF 333.

S-CSCF 333 reads the message header of the registration request and selects the same UDM used by I-CSCF 332 based on the origin host AVP. S-CSCF 333 generates and transfers an MAR to the UDM. The UDM receives the MAR and retrieves authentication data for UE 301 to verify the identity of UE 301 reported in the registration request. For example, the UDM may access a Unified Data Registry (UDR) in network circuitry 330 to retrieve the authentication data. The UDM transfers a Multimedia Authentication Answer (MAA) comprising the authentication data to S-CSCF 333. S-CSCF 333 selects authentication data based on the MAA to generate an authentication challenge. Typically, the authentication challenge involves hashing a random number using a secret identify code associated with UE 301 and comparing the result to an authentication response generated by UE 301. The identity of UE 301 is confirmed when the challenge and the response match. Returning to the operation, S-CSCF 333 transfers the authentication (AUTH.) challenge to I-CSCF 332 for delivery to UE 301. I-CSCF 332 forwards the challenge to P-CSCF 331. P-CSCF 331 forwards the challenge to UE 301 via network circuitry 320 and RAN 311.

UE 301 receives the authentication challenge and generates an authentication response to verify its identity. UE 301 and P-CSCF 331 interface to set up a secure signaling channel. Once established, UE 301 transfers a second registration request addressed for P-CSCF 331 to control plane 321 over RAN 311. The second registration request includes the authentication response generated by UE 301. P-CSCF 331 receives the second registration request and forwards the second request to I-CSCF 332. I-CSCF 332 generates and transfers a second UAR to the same UDM based on the origin host AVP. The UDM replies with a UAA that indicates the available S-CSCFs. I-CSCF 332 inserts the origin host AVP into a message header of the second registration request. I-CSCF 332 selects S-CSCF 333 and forwards the second request to S-CSCF 333. In some, examples, I-CSCF 332 may select a different S-CSCF, however it should be appreciated that because the origin host AVP is included in the message header, the different S-CSCF would still route registration signaling back to the same UDM used by I-CSCF 332.

S-CSCF 333 receives the second registration request and identifies the origin host AVP for the UDM in the message header. S-CSCF 333 selects the same UDM based on the origin host AVP. S-CSCF 333 generates and transfers a Server Assignment Request (SAR) to the UDM to retrieve subscriber information for UE 301. The UDM receives the SAR and returns an SAA that comprises the subscriber data. S-CSCF 333 compares the authentication response generated by UE 301 that was included in the second registration request to the subscriber data to verify the identity of UE 301. In response to the authentication, S-CSCF 333 registers UE 301 for IMS services over IMS circuitry 330. S-CSCF 333 transfers registration approval message to I-CSCF 332 for delivery to UE 301. I-CSCF 332 forwards the approval to P-CSCF 331. P-CSCF 331 forwards the approval to UE 301 via network circuitry 320 and RAN 311. UE 301 receives the registration confirmation and responsively initiates an IMS session. In some examples, S-CSCF 333 may forward a Third-Party Registration (TPR) message to service provider 341 to setup the IMS session for UE 301. For example, S-CSCF 333 may include the origin host AVP for the selected UDM in a header of the TPR message and transfer the TPR message to an application server associated with server provider 341. The application server may then interface with the UDM using the received origin host AVP to perform a TPR procedure for the application server and UE 301.

Figure 6:
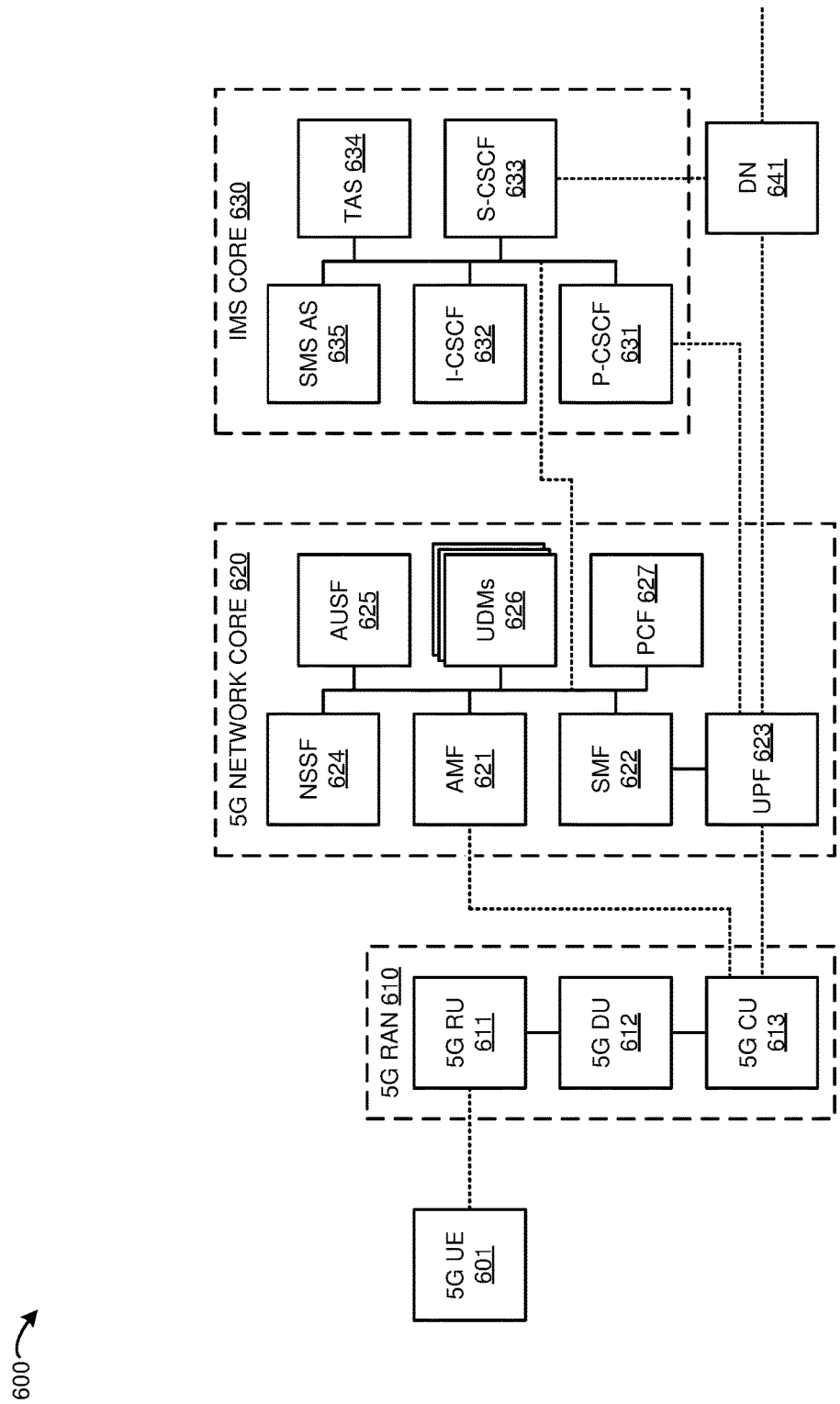
FIG. 6 illustrates a Fifth Generation (5G) wireless communication network to register a 5G UE with an IMS core.

FIG. 6 illustrates 5G communication network 600 to register a 5G UE with an IMS core. 5G communication network 600 comprises an example of wireless communication networks 100 and 300, although networks 100 and 300 may differ. 5G communication network 600 comprises 5G UE 601, 5G RAN 610, 5G network core 620, IMS core 630, and data network (DN) 641. 5G RAN 610 comprises 5G Radio Unit (RU) 611, 5G Distributed Unit (DU) 612, and 5G Centralized Unit (CU) 613. 5G network core 620 comprises AMF 621, SMF 622, UPF 623, Network Slice Selection Function (NSSF) 624, Authentication Server Function 625, UDMs 626, and Policy Control Function (PCF) 627. IMS core 630 comprises P-CSCF 631, I-CSCF 632, S-CSCF 633, TAS 634, and SMS AS 635. Other network functions and network elements like Network Repository Function (NRF), Network Exposure Function (NEF), UDR, and HSS are typically present in 5G network core 620 but are omitted for clarity. In other examples, wireless network communication network 600 may comprise additional or different elements than those illustrated in FIG. 6.

UE 601 wirelessly attaches to CU 613 via DU 612 and RU 611. UE 601 exchanges attachment signaling with CU 613 to establish a connection with 5G network applications hosted by CU 613. The attachment signaling indicates information like a registration type, UE capabilities, requested slice types, and IMS Protocol Data Unit (PDU) session requests. CU 613 transfers a registration request for UE 601 to AMF 621. The registration request comprises the information transferred by UE 601 in the attachment signaling. AMF 621 transfers an identity request to UE 601 via RAN 610. UE 601 responsively indicates its identity to AMF 621 via RAN 610. AMF 621 interacts with NSSF 624, AUSF 625, one or more of UDMs 626, and PCF 627 to authenticate and authorize UE 601 for wireless data service.

Responsive to the authentication and authorization, AMF 621 retrieves Quality-of-Service (QOS) metrics, allowed slice identifiers, service attributes, IMS permissions, and the like from one of UDMs 626. AMF 621 interfaces with NSSF 624 to select a network slice for UE 601. NSSF 624 responds with a slice ID for UE 601 based on the service attributes. AMF 621 selects SMF 622 to serve UE 601 based on the slice ID, QOS metrics, service attributes, and/or other data retrieved from the one of UDMs 626. SMF 622 selects P-CSCF 631 and UPF 623 based on the service information provided by the one of UDMs 626. SMF 622 indicates the network addresses for UPF 623 and P-CSCF 631 to AMF 621. AMF 621 generates UE context for UE 601 using the received information. The UE context comprises the QoS metrics, the slice ID, the network addresses, the service attributes, and the like. AMF 621 transfers the UE context to UE 601 over RAN 610.

UE 601 initiates an IMS registration request to register with IMS core 630. UE 601 generates a registration request and uses the network address P-CSCF 631 in the UE context to transfer the registration message to CU 613 over RU 611 and DU 612. CU 613 transfers the registration request to UPF 623. UPF 623 identifies the network address in the registration request and forwards the request to P-CSCF 631. P-CSCF 631 receives the registration request from UPF 623. P-CSCF 631 retrieves a network address for I-CSCF 632 (e.g., by DNS query) and forwards the registration request to I-CSCF 632 using the retrieved network address. I-CSCF 632 generates a UAR to identify available S-CSCFs and transfers the UAR for delivery to one of UDMs 626. The one of the UDMs determines a set of available S-CSCFs, including S-CSCF 633, and transfers a UAA indicating the S-CSCFs and the network address for the UDM. For example, the network address may be used as a server ID for the UDM. I-CSCF 632 receives the UAA and inserts the network address in a message header of the registration request. For example, the message header may comprise a P-Mav-Dest-Host header. I-CSCF 632 forwards the registration request with the network address to S-CSCF 633.

S-CSCF 633 receives the registration request and reads the message header to determine the network address of the UDM used by I-CSCF 632. S-CSCF 633 generates a MAR to retrieve user authentication data associated with UE 601. S-CSCF 633 transfers the MAR for delivery to the same UDM of UDMs 626 that was used by I-CSCF 632. The UDM receives the MAR and accesses a subscriber profile for UE 601 to retrieve authentication data. The authentication data typically includes a random number, an authentication token, a signed result, a cipher key, and an integrity key. The UDM transfers a MAA that includes the authentication data to S-CSCF 633.

S-CSCF 633 selects authentication vectors to verify the identity of UE 601 based on the authentication data. S-CSCF 633 generates a Session Initiation Protocol (SIP) 401 message that comprises the authentication data and the network address for the UDM. S-CSCF 633 transfers the SIP 401 message to I-CSCF 632 which in turn forwards the SIP 401 message to P-CSCF 631. P-CSCF 631 removes and caches a portion of the authentication data from the SIP 401 message. P-CSFC 631 transfers the SIP 401 message to UPF 623 for delivery to UE 601. The remaining authentication data in the SIP 401 message comprises a random number and authentication token that UE 601 can use to generate an authentication response to verify its identity. UPF 623 transfers the SIP 401 message to UE 601 over RAN 610. UE 601 and P-CSCF 631 exchange signaling to set up a secure signaling channel using authentication data cached by P-CSCF 631. For example, the cached authentication data may comprise ciphering and integrity keys. UE 601 uses the random number received in the SIP 401 message to generate an authentication response. For example, UE 601 may hash the random number using its secret identity code to generate the authentication response.

UE 601 generates a second IMS registration request to complete the registration with IMS core 630. UE 601 includes the network address for the UDM and the authentication response in the second registration request. UE 601 addresses the second request for P-CSCF 631 and transfers the second request to CU 613 over RU 611 and DU 612. CU 613 transfers the second registration request to UPF 623. UPF 623 identifies the network address in the second registration request and forwards the request to P-CSCF 631. P-CSCF 631 receives the second registration request from UPF 623. P-CSCF 631 address the second registration request for I-CSCF 632 and forwards the request. I-CSCF 632 reads the network address in the second registration request generates a second UAR for delivery to the same UDM. The UDM receives the UAR and determines a set of S-CSCFs and transfers a UAA indicating the S-CSCFs and the network address for the UDM to I-CSCF 632. I-CSCF 632 receives the UAA and selects S-CSCF 633. I-CSCF 632 forwards the second registration request with the network address and authentication response to S-CSCF 633. In other examples, I-CSCF 632 may select a different S-CSCF. When a different S-CSCF is used in the second registration, the different S-CSCF still transfers signaling to the same UDM due to the inclusion of the network address in the message header of the second registration request.

Returning to the operation, S-CSCF 633 receives the second registration request and reads the message header to determine the network address of the UDM used by I-CSCF 632. S-CSCF 633 generates a SAR to retrieve subscriber data associated with UE 601 to verify the authentication response generated by UE 601. S-CSCF 633 transfers the SAR for delivery to the same UDM of UDMs 626 that was used by I-CSCF 632 based on the network address. The UDM receives the SAR and accesses a subscriber profile for UE 601 to retrieve the subscriber data. The UDM transfers an SAA that includes the subscriber data to S-CSCF 633. S-CSCF 633 matches an expected result for the authentication challenge to the authentication response from UE 601 to authenticate the identity of UE 601. S-CSCF 633 registers UE 601 for IMS service based on the authentication. S-CSCF 633 generates a SIP 200 message to acknowledge the registration. S-CSCF 633 includes the network address for the UDM in a message header of the SIP 200 message. S-CSCF 633 transfers the SIP 200 message to I-CSCF 632 which in turn forwards the SIP 200 message to P-CSCF 631. P-CSFC 631 transfers the SIP 200 message to UPF 623 for delivery to UE 601. UPF 623 transfers the SIP 200 message to UE 601 over RAN 610.

Once registered, UE 601 initiates a Mobile Originated (MO) IMS voice session (or some other type of IMS media session) with IMS core 630. UE 601 generates a SIP invite message and addresses the message for delivery to P-CSCF 631. UE 601 transfers the SIP invite to CU 613 over RU 611 and DU 612. CU 613 transfers the SIP invite to UPF 623. UPF 623 forwards the SIP invite message to P-CSCF 631 based on the address. P-CSCF 631 interfaces with I-CSCF 632 and S-CSCF 633 to deliver the SIP invite to a message destination. S-CSCF 632 processes the SIP invite to select a message destination to setup the MO IMS session. S-CSCF 632 transfers the SIP invite to an application server in data network 641. The data network accepts the SIP invite and S-CSCF 633 indicates the acceptance to UE 601 over 5G core network 620. UE 601 exchanges user data for the MO IMS voice session with UPF 623 over RAN 610. UPF 623 exchanges the user data for the MO IMS voice session with the application server in data network 641. S-CSCF 633 interfaces with one or more of P-CSCF 631, I-CSFC 632, TAS 634, and SMS AS 635 to monitor the MO IMS voice session and control the data flow between UE 601 and data network 641. In some examples, S-CSCF 633 may forward a TPR message to data network 641 to setup the MO IMS session for UE 601. For example, S-CSCF 633 may include the network address for the selected UDM in a header of the TPR message and transfer the TPR message to an application server in data network 641. The application server may then interface with the same UDM using the received network address to perform a TPR procedure for the application server and UE 601.

Figure 7:
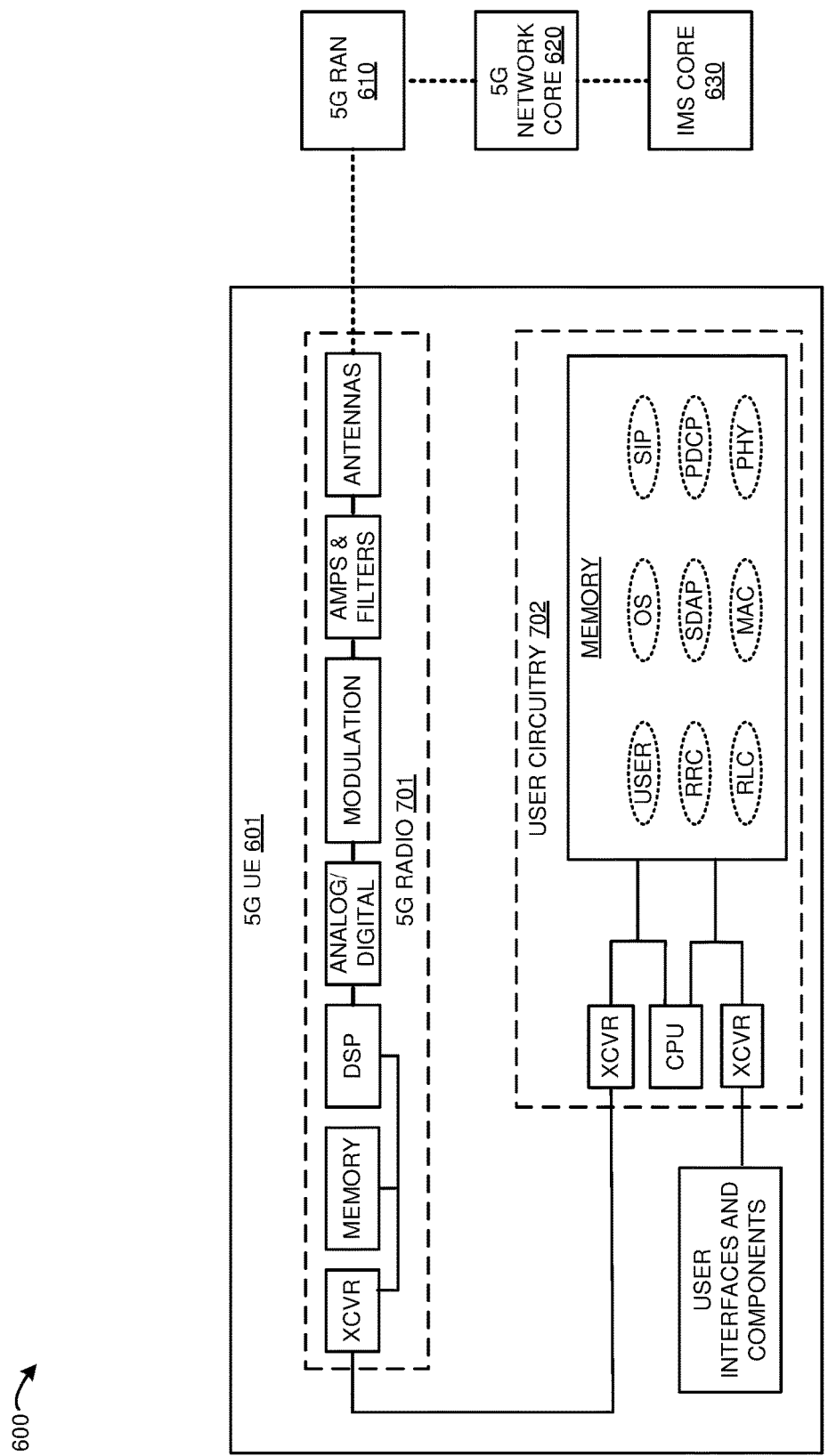
FIG. 7 illustrates the 5G UE in the 5G communication network.

FIG. 7 illustrates 5G UE 601 in 5G communication network 600. UE 601 comprises an example of user devices 101 illustrated in FIG. 1 and UE 301 illustrated in FIG. 3, however user devices 101 and UE 301 may differ.

UE 601 comprises 5G radio 701 and user circuitry 702. Radio 701 comprises antennas, amplifiers, filters, modulation, analog-to-digital interfaces, Digital Signal Processers (DSP), memory, and transceivers (XCVRs) that are coupled over bus circuitry. User circuitry 702 comprises memory, CPU, user interfaces and components, and transceivers that are coupled over bus circuitry. The memory in user circuitry 702 stores an operating system (OS), user applications (USER), and 5GNR network applications for Physical Layer (PHY), Media Access Control (MAC), Radio Link Control (RLC), Packet Data Convergence Protocol (PDCP), Service Data Adaptation Protocol (SDAP), Radio Resource Control (RRC), and Session Initiation Protocol (SIP). The antenna in radio 701 is wirelessly coupled to 5G RAN 610 over a 5GNR link. A transceiver in radio 701 is coupled to a transceiver in user circuitry 702. A transceiver in user circuitry 702 is typically coupled to the user interfaces and components like displays, controllers, and memory.

In radio 701, the antennas receive wireless signals from 5G RAN 610 that transport downlink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequency. The analog/digital interfaces convert the demodulated analog signals into digital signals for the DSPs. The DSPs transfer corresponding 5GNR symbols to user circuitry 702 over the transceivers. In user circuitry 702, the CPU executes the network applications to process the 5GNR symbols and recover the downlink 5GNR signaling and data. The 5GNR network applications receive new uplink signaling and data from the user applications. The network applications process the uplink user signaling and the downlink 5GNR signaling to generate new downlink user signaling and new uplink 5GNR signaling. The network applications transfer the new downlink user signaling and data to the user applications. The 5GNR network applications process the new uplink 5GNR signaling and user data to generate corresponding uplink 5GNR symbols that carry the uplink 5GNR signaling and data.

In radio 701, the DSP processes the uplink 5GNR symbols to generate corresponding digital signals for the analog-to-digital interfaces. The analog-to-digital interfaces convert the digital uplink signals into analog uplink signals for modulation. Modulation up-converts the uplink analog signals to their carrier frequency. The amplifiers boost the modulated uplink signals for the filters which attenuate unwanted out-of-band energy. The filters transfer the filtered uplink signals through duplexers to the antennas. The electrical uplink signals drive the antennas to emit corresponding wireless 5GNR signals to 5G RAN 610 that transport the uplink 5GNR signaling and data.

RRC functions comprise authentication, security, handover control, status reporting, QoS, network broadcasts and pages, and network selection. SDAP functions comprise QoS marking and flow control. PDCP functions comprise security ciphering, header compression and decompression, sequence numbering and re-sequencing, de-duplication.

RLC functions comprise Automatic Repeat Request (ARQ), sequence numbering and resequencing, segmentation and resegmentation. MAC functions comprise buffer status, power control, channel quality, Hybrid ARQ (HARQ), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, channel coding/decoding, channel estimation/equalization, and rate matching/de-matching, scrambling/descrambling, modulation mapping/de-mapping, layer mapping/de-mapping, precoding, Resource Element (RE) mapping/de-mapping, Fast Fourier Transforms (FFTs)/Inverse FFTs (IFFTs), and Discrete Fourier Transforms (DFTs)/Inverse DFTs (IDFTs). SIP functions comprise generating SIP invite messages and processing received SIP messages.

Figure 8:
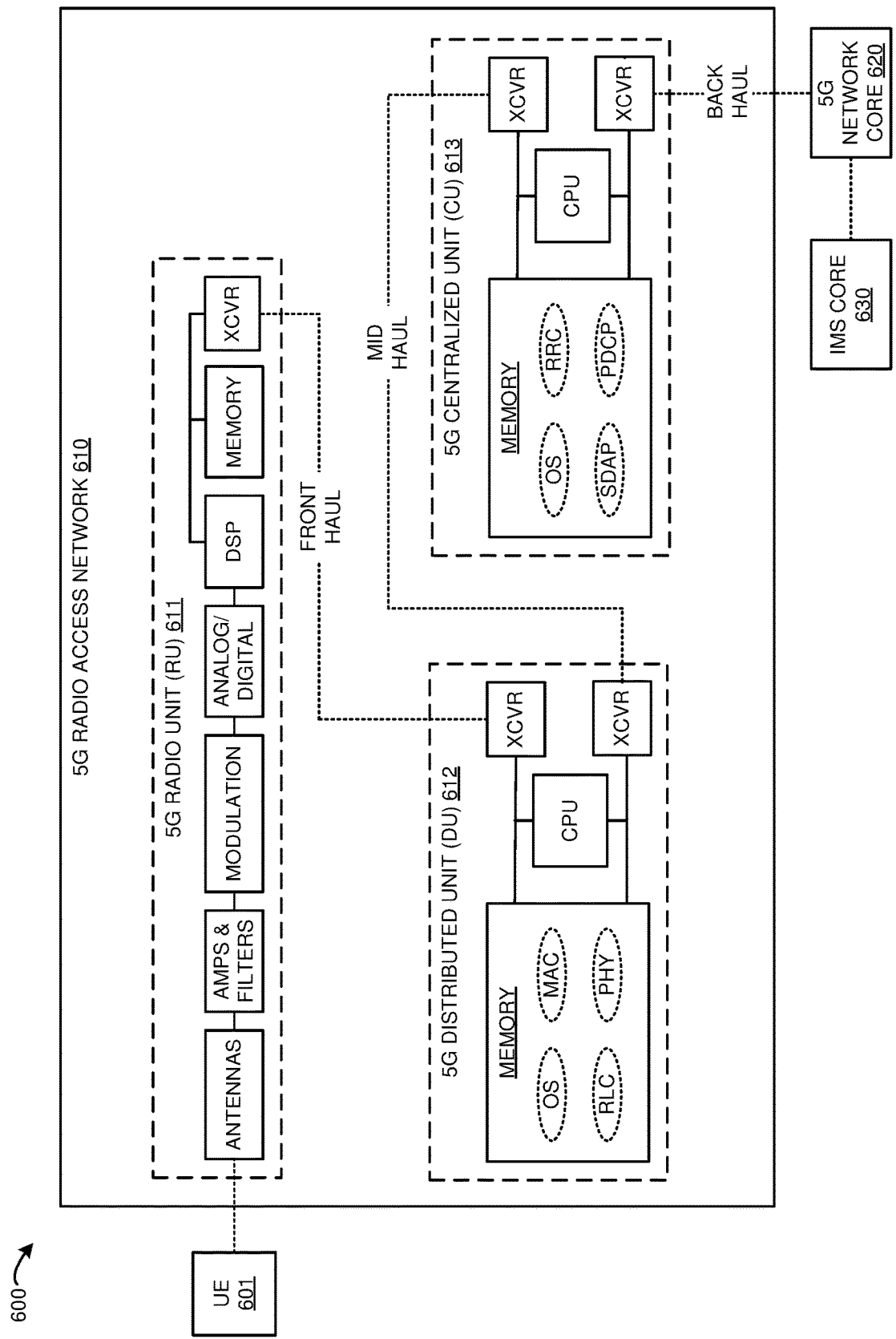
FIG. 8 illustrates a 5G Radio Access Network (RAN) in the 5G wireless communication network.

FIG. 8 illustrates 5G RU 611, 5G DU 612, and 5G CU 613 in 5G communication network 600. RU 611, DU 612, and CU 613 comprise an example of access network 111 illustrated in FIG. 1 and RAN 311 illustrated in FIG. 3, however access network 111 and RAN 311 may differ.

RU 611 comprises antennas, amplifiers, filters, modulation, analog-to-digital interfaces, DSP, memory, and transceivers (XCVRs) that are coupled over bus circuitry. UE 601 is wirelessly coupled to the antennas in RU 611 over 5GNR links. Transceivers in 5G RU 611 are coupled to transceivers in 5G DU 612 over fronthaul links like enhanced Common Public Radio Interface (eCPRI). The DSPs in RU 611 executes their operating systems and radio applications to exchange 5GNR signals with UE 601 and to exchange 5GNR data with DU 612.

For the uplink, the antennas receive wireless signals from UE 601 that transport uplink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequencies. The analog/digital interfaces convert the demodulated analog signals into digital signals for the DSPs. The DSPs transfer corresponding 5GNR symbols to DU 612 over the transceivers.

For the downlink, the DSPs receive downlink 5GNR symbols from DU 612. The DSPs process the downlink 5GNR symbols to generate corresponding digital signals for the analog-to-digital interfaces. The analog-to-digital interfaces convert the digital signals into analog signals for modulation. Modulation up-converts the analog signals to their carrier frequencies. The amplifiers boost the modulated signals for the filters which attenuate unwanted out-of-band energy. The filters transfer the filtered electrical signals through duplexers to the antennas. The filtered electrical signals drive the antennas to emit corresponding wireless signals to UE 601 that transport the downlink 5GNR signaling and data.

DU 612 comprises memory, CPU, and transceivers that are coupled over bus circuitry. The memory in 5G DU 612 stores operating systems and 5GNR network applications like PHY, MAC, and RLC. CU 613 comprises memory, CPU, and transceivers that are coupled over bus circuitry. The memory in CU 613 stores an operating system and 5GNR network applications like PDCP, SDAP, and RRC. Transceivers in 5G DU 612 are coupled to transceivers in RU 611 over front-haul links. Transceivers in DU 612 are coupled to transceivers in CU 613 over mid-haul links. A transceiver in CU 613 is coupled to network core 620 over backhaul links.

RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, guard-insertion/guard-deletion, parsing/de-parsing, control insertion/removal, interleaving/de-interleaving, FEC encoding/decoding, channel coding/decoding, channel estimation/equalization, and rate matching/de-matching, scrambling/descrambling, modulation mapping/de-mapping, layer mapping/de-mapping, precoding, RE mapping/de-mapping, FFTs/IFFTs, and DFTs/IDFTs. PDCP functions include security ciphering, header compression and decompression, sequence numbering and re-sequencing, de-duplication. SDAP functions include QoS marking and flow control. RRC functions include authentication, security, handover control, status reporting, QoS, network broadcasts and pages, and network selection.

Figure 9:
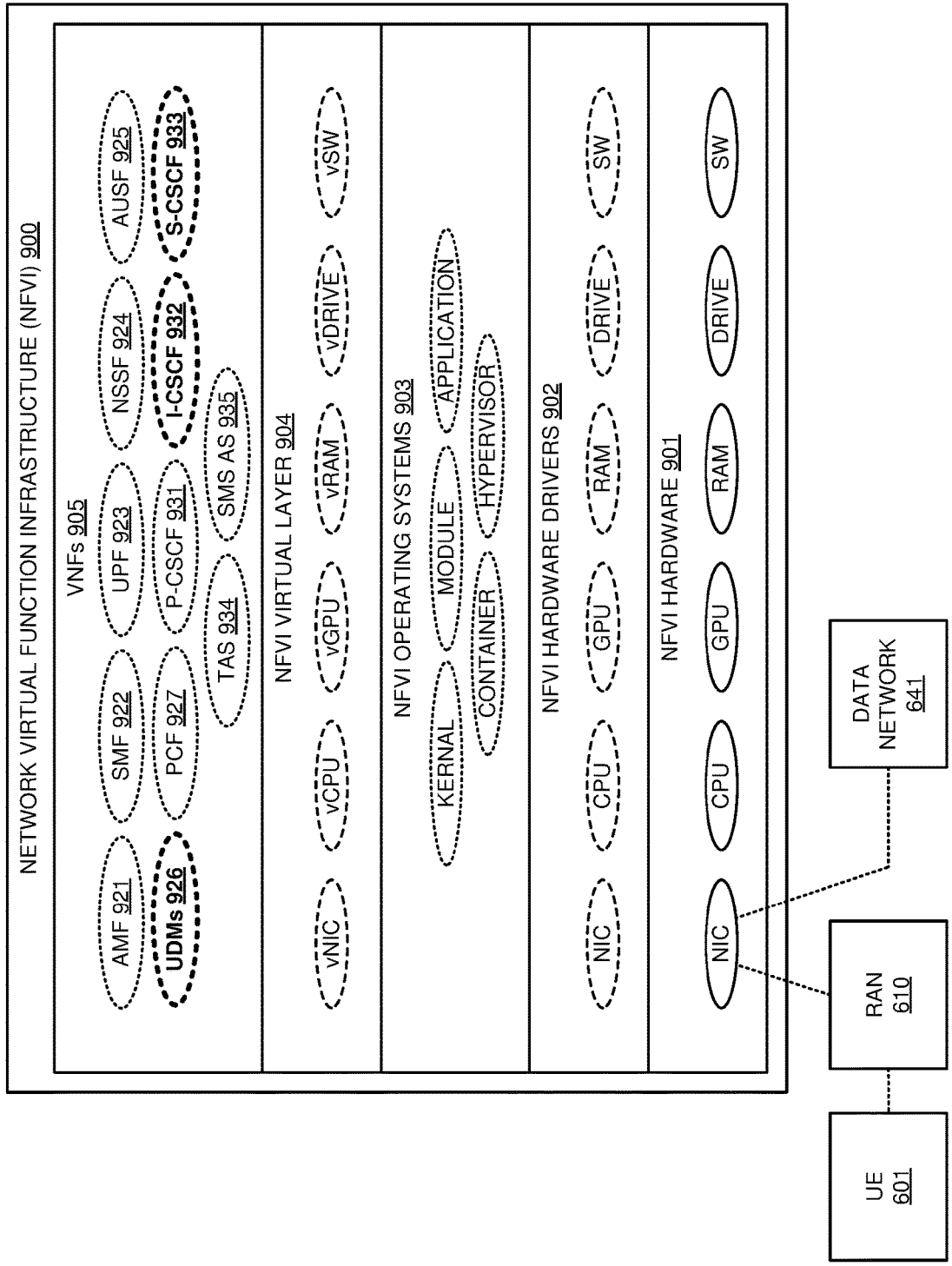
FIG. 9 illustrates a Network Function Virtualization Infrastructure (NFVI) in the 5G wireless communication network.

FIG. 9 illustrates Network Function Virtualization Infrastructure (NFVI) 900. NFVI 900 comprises an example of core network 121 and multimedia system 131 illustrated in FIG. 1 and network circuitry 320 and IMS circuitry 330 illustrated in FIG. 3, although core network 121, multimedia system 131, network circuitry 320, and IMS circuitry 330 may differ. NFVI 900 comprises NFVI hardware 901, NFVI hardware drivers 902, NFVI operating systems 903, NFVI virtual layer 904, and NFVI Virtual Network Functions (VNFs) 905. NFVI hardware 901 comprises Network Interface Cards (NICs), CPU, GPU, RAM, Flash/Disk Drives (DRIVE), and Data Switches (SW). NFVI hardware drivers 902 comprise software that is resident in the NIC, CPU, GPU, RAM, DRIVE, and SW. NFVI operating systems 903 comprise kernels, modules, applications, containers, hypervisors, and the like. NFVI virtual layer 904 comprises vNIC, vCPU, vGPU, vRAM, vDRIVE, and vSW. NFVI VNFs 905 comprise AMF 921, SMF 922, UPF 923, NSSF 924, AUSF 925, UDMs 926, PCF 927, P-CSCF 931, S-CSCF 932, I-CSCF 933, TAS 934, and SMS AS 935. Additional VNFs and network elements like NEF, NRF, UDR, and HSS are typically present but are omitted for clarity. NFVI 900 may be located at a single site or be distributed across multiple geographic locations. For example, a first portion of NFVI 900 may be located at a first geographic location dedicated to the network functions in 5G network core 620 while a second portion of NFVI 900 may be located at a second geographic location dedicated to the IMS functions in IMS core 630. The NIC in NFVI hardware 901 is coupled to RAN 610 and data network 641. NFVI hardware 901 executes NFVI hardware drivers 902, NFVI operating systems 903, NFVI virtual layer 904, and NFVI VNFs 905 to form AMF 621, SMF 622, UPF 623, NSSF 624, AUSF 625, UDMs 626, PCF 627, P-CSCF 631, I-CSCF 632, S-CSCF 633, TAS 634, and SMS AS 635.

Figure 10:
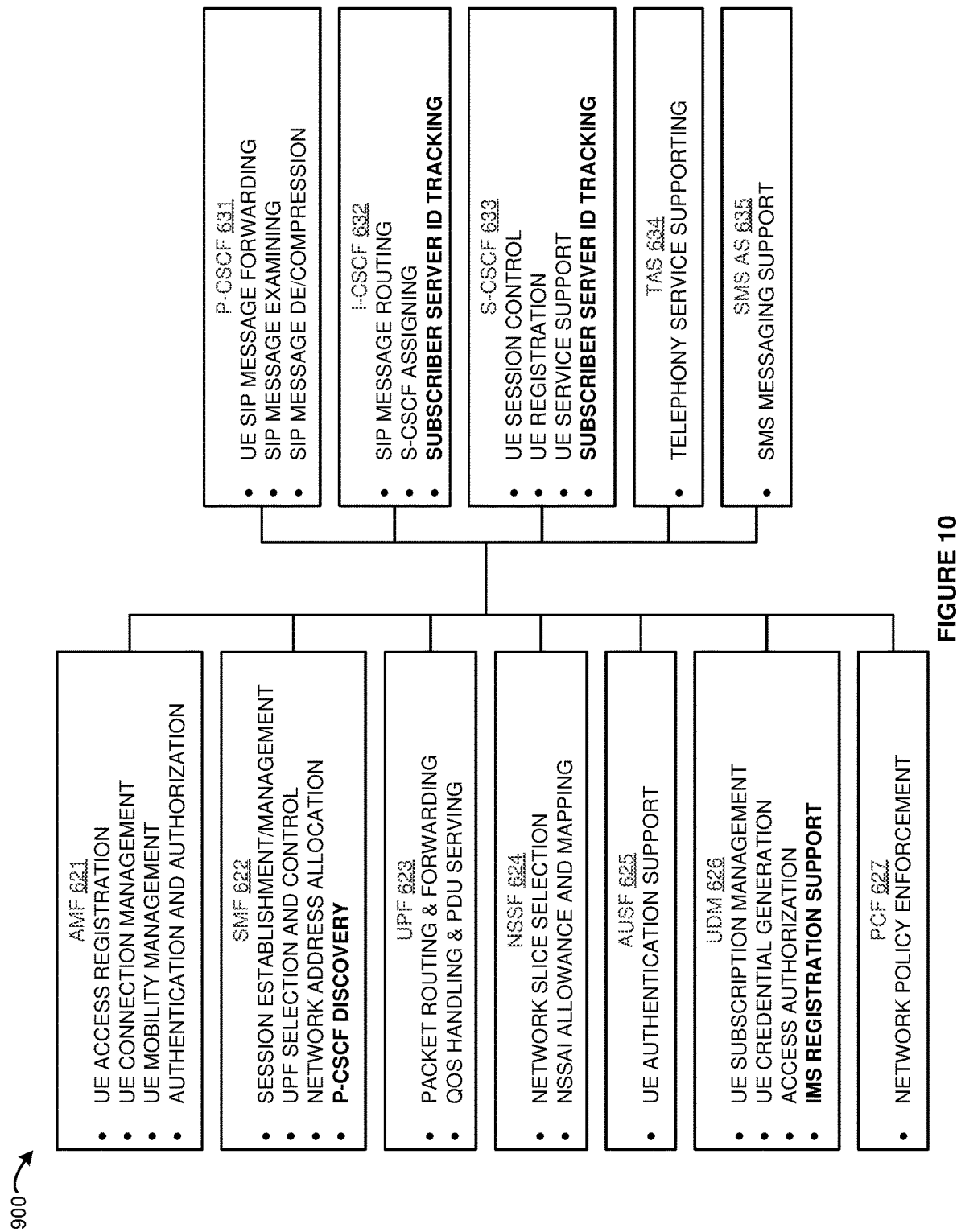
FIG. 10 further illustrates the NFVI in the 5G wireless communication network.

FIG. 10 further illustrates NFVI 900 in 5G communication network 600. AMF 621 performs UE access registration, UE connection management, UE mobility management, and authentication and authorization. SMF 622 performs session establishment and management, UPF selection and control, and network address allocation. UPF 623 performs packet routing and forwarding and QoS handling and PDU serving. NSSF 624 performs network slice selection and NSSAI allowance and mapping. AUSF 625 performs UE authentication support. UDMs 626 perform UE subscription management, UE credential generation, access authorization, and IMS registration support. PCF 627 performs network policy enforcement. P-CSCF 631 performs UE SIP message forwarding, SIP message examining, and SIP message compression/decompression. I-CSCF 632 performs SIP message routing, S-CSCF assigning, and subscriber server ID tracking. S-CSCF 633 performs UE session control, UE registration, UE service supporting, and subscriber server ID tracking. TAS 634 performs telephony service supporting. SMS AS 635 performs SMS messaging support.

In operation, AMF 621 receives a registration request for UE 601 to register with network core 620 for wireless data services. The registration request comprises registration type, UE capabilities, requested slice types, IMS PDU session requests, and the like. AMF 621 transfers an identity request for delivery to UE 601. AMF 621 receives an identify indication for UE 601. AMF 621 interacts with NSSF 624, AUSF 625, one or more of UDMs 626, and PCF 627 to authenticate and authorize UE 601 for wireless data service. Responsive to the authentication and authorization, AMF 621 requests QoS metrics, allowed slice identifiers, service attributes, IMS permissions, and the like from one of UDMs 626. The UDM accesses a subscriber profile for UE 601 to retrieve the request information. The UDM transfers the requested subscriber information to AMF 621. AMF 621 interfaces with NSSF 624 to select a network slice for UE 601. NSSF 624 responds with a slice ID for UE 601 based on the service attributes. AMF 621 selects SMF 622 to serve UE 601 based on the data retrieved from the UDM. SMF 622 selects P-CSCF 631 and UPF 623 based on the service information provided by the one of UDMs 626. SMF 622 indicates the network addresses for UPF 623 and P-CSCF 631 to AMF 621. AMF 621 generates UE context for UE 601 using the received information. The UE context comprises the QoS metrics, the slice ID, the network addresses, the service attributes, and the like. AMF 621 transfers the UE context for delivery to UE 601.

UPF 623 receives an IMS registration request generated by UE 601. UPF 623 reads the network address in the request and forwards the request to P-CSCF 631. P-CSCF 631 receives the registration request and performs a DNS query to retrieve a network address for I-CSCF 632. P-CSCF 631 forwards the registration request to I-CSCF 632. I-CSCF 632 generates and transfers a UAR to one of UDMs 626. The one of the UDMs determines a set of available S-CSCFs and transfers a UAA indicating the S-CSCFs and the network address for the UDM. I-CSCF 632 receives the UAA. I-SCF 632 inserts the network address in a message header of the registration request and forwards the registration request with the network address to S-CSCF 633.

S-CSCF 633 receives the registration request and reads the message header to determine the network address of the UDM used by I-CSCF 632. S-CSCF 633 generates a MAR to retrieve user authentication data associated with UE 601. S-CSCF 633 transfers the MAR for delivery to the same UDM that was used by I-CSCF 632 based on the network address. The UDM receives the MAR. The UDM accesses a subscriber profile for UE 601 to retrieve authentication data including a random number, an authentication token, a signed result, a cipher key, and an integrity key. The UDM transfers a MAA that includes the authentication data to S-CSCF 633.

S-CSCF 633 selects authentication vectors to verify the identity of UE 601 based on the authentication data. S-CSCF 633 generates a SIP 401 message that comprises the authentication data and the network address for the UDM. S-CSCF 633 transfers the SIP 401 message to I-CSCF 632 which in turn forwards the SIP 401 message to P-CSCF 631. P-CSCF 631 removes and caches a portion of the authentication data from the SIP 401 message. The cached portion of the authentication data comprises ciphering and integrity keys. P-CSFC 631 transfers the SIP 401 message to UPF 623 for delivery to UE 601. The remaining authentication data comprises a random number and authentication token usable by UE 601 to generate an authentication response. UPF 623 transfers the SIP 401 message to UE 601 over RAN 610. P-CSCF 631 establishes a secure signaling channel with UE 601 using the cached ciphering and integrity keys.

UPF 623 receives a second IMS registration request generated by UE 601. The second registration request comprises the network address for the UDM, and an authentication response generated by UE. UPF 623 forwards the second registration request to P-CSCF 631 which in turn forwards the second registration request to I-CSCF 632. I-CSCF 632 reads the network address in the second registration request generates a second UAR for delivery to the same UDM. The UDM receives the UAR and transfers a UAA indicating the S-CSCFs and the network address for the UDM to I-CSCF 632. I-CSCF 632 receives the UAA and selects S-CSCF 633. I-CSCF 632 forwards the second registration request with the network address and authentication response to S-CSCF 633.

S-CSCF 633 receives the second registration request and reads the message header to determine the network address of the UDM used by I-CSCF 632. S-CSCF 633 generates a SAR to retrieve subscriber data associated with UE 601 to verify the authentication response generated by UE 601. S-CSCF 633 transfers the SAR for delivery to the same UDM of UDMs 626 that was used by I-CSCF 632 based on the network address. The UDM receives the SAR and accesses a subscriber profile for UE 601 to retrieve the subscriber data. The UDM transfers an SAA that includes the subscriber data to S-CSCF 633. S-CSCF 633 compares an expected result for the authentication challenge to the authentication response from UE 601. S-CSCF 633 authenticates the identity of UE 601 when the expected result matches authentication response. S-CSCF 633 registers UE 601 for IMS service based on the authentication. S-CSCF 633 generates a SIP 200 message to acknowledge the registration. S-CSCF 633 includes the network address for the UDM in a message header of the SIP 200 message. S-CSCF 633 transfers the SIP 200 message to I-CSCF 632 which in turn forwards the SIP 200 message to P-CSCF 631. P-CSFC 631 transfers the SIP 200 message to UPF 623. UPF 623 transfers the SIP 200 message for delivery to UE 601.

UPF 623 receives a SIP invite generated by UE 601 to initiate an MO IMS voice session. UPF 623 forwards the SIP invite message to P-CSCF 631 based. P-CSCF 631 interfaces with I-CSCF 632 and S-CSCF 633 to deliver the SIP invite to a message destination. S-CSCF 632 processes the SIP invite to select a message destination to establish the MO IMS session. S-CSCF 632 transfers the SIP invite to an application server in data network 641. The application server in data network 641 accepts the SIP invite and S-CSCF 633 indicates the acceptance to UE 601 over 5G core network 620. UPF 623 exchanges the user data for the MO IMS voice session with UE 601. UPF 623 exchanges the user data for the MO IMS voice session with the application server in data network 641. S-CSCF 633 interacts with TAS 634 to monitor the MO IMS voice session and control the data flow between UE 601 and data network 641.

Figure 11:
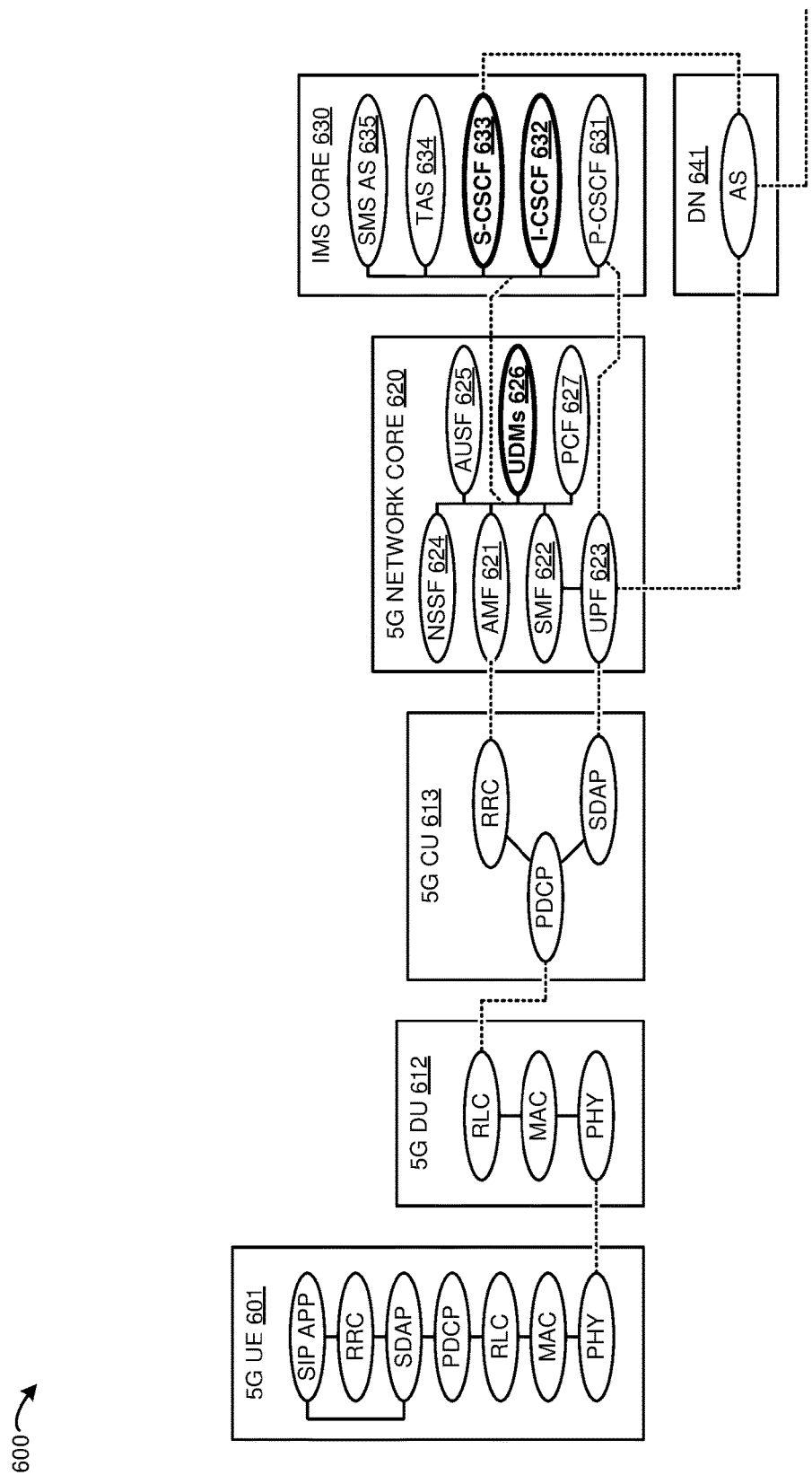
FIG. 11 illustrates an exemplary operation of the 5G wireless communication network to register the UE with the IMS core.

FIG. 11 illustrates an exemplary operation of 5G communication network 600 to register wireless user devices with an IMS core. The operation may vary in other examples. In operation, a user application in UE 601 executes and UE 601 wirelessly attaches to RAN 610. The RRC in UE 601 exchanges attachment signaling with the RRC in CU 613 over the PDCPs, RLCs, MACs, and PHYs. The RRC in CU 613 transfers a registration request comprising a registration type, UE capabilities, requested slice types, and IMS PDU session requests to AMF 621. AMF 621 transfers an identity request for UE 601 to the RRC in CU 613. The RRC in CU 613 forwards the registration request to the RRC in UE 601 over the PDCPs, RLCs, MACs, and PHYs. The RRC in UE 601 transfers an identity indication to the RRC in CU 613 over the PDCPs, RLCs, MACs, and PHYs. The RRC in CU 613 forwards the identity indication to AMF 621. AMF 621 interacts with NSSF 624, AUSF 625, one or more of UDMs 626, and PCF 627 to authenticate and authorize UE 601 for wireless data service.

Responsive to the authentication and authorization, AMF 621 retrieves QoS metrics, allowed slice identifiers, service attributes, IMS permissions, and the like from one of UDMs 626. The UDM pulls the requested data from a subscriber profile for UE 601 and transfers the data to AMF 621. AMF 621 interfaces with NSSF 624 to select a network slice for UE 601. AMF 621 selects SMF 622 to serve UE 601. SMF 622 selects P-CSCF 631 and UPF 623. SMF 622 indicates the network addresses for UPF 623 and P-CSCF 631 to AMF 621. AMF 621 generates UE context comprises the QoS metrics, the slice ID, the network addresses, the service attributes, and the like. AMF 621 transfers the UE context to the RRC in CU 613. The RRC in CU 613 transfers the UE context to the RRC in UE 601 over the PDCPs, RLCs, MACs, and PHYS.

In response to a user input, the SIP application in UE 601 executes, and UE 601 initiates an IMS registration procedure to register with IMS core 630. The RRC in UE 601 drives the SIP application to generate a SIP registration message. The SDAP in UE 601 addresses the SIP registration message using the network address P-CSCF 631 in the UE context. The SDAP in UE 601 transfers the SIP registration message to the SDAP in CU 613 over the PDCPs, RLCs, MACs, and PHYs. The SDAP in CU 613 transfers the SIP registration message to UPF 623. UPF 623 transfers the SIP registration to P-CSCF 631 using the network address for P-CSCF 631. P-CSCF 631 receives the SIP registration request from UPF 623 and performs a DNS query to retrieve a network address for I-CSCF 632. P-CSCF 631 forwards the SIP registration request to I-CSCF 632 using the retrieved network address. I-CSCF 632 generates a UAR to identify available S-CSCFs and transfers the UAR for delivery to one of UDMs 626. The one of the UDMs transfers a UAA indicating the S-CSCFs and a network address for the UDM to I-CSCF 632. I-CSCF 632 receives the UAA and selects S-CSCF 633. I-CSCF 632 inserts the network address for the UDM in a P-Mav-Dest-Host header of the SIP registration request. I-CSCF 632 forwards the SIP registration request with the UDM network address to S-CSCF 633.

S-CSCF 633 receives the SIP registration request and reads the P-Mav-Dest-Host header to determine the network address of the UDM used by I-CSCF 632. S-CSCF 633 generates a MAR to retrieve user authentication data associated with UE 601. S-CSCF 633 transfers the MAR to the same UDM of UDMs 626 that was used by I-CSCF 632 based on the network address in the P-Mav-Dest-Host header. The UDM receives the MAR and accesses a subscriber profile for UE 601 to retrieve a random number, an authentication token, a signed result, a cipher key, and an integrity key to authenticate UE 601. The UDM transfers a MAA that includes the random number, authentication token, signed result, cipher key, and integrity key to S-CSCF 633.

S-CSCF 633 selects authentication vectors to verify the identity of UE 601 based on the MAA and caches the signed result. S-CSCF 633 generates a SIP 401 message that comprises the random number, the authentication token, the cipher key, and the integrity key. S-CSCF 633 inserts the network address for the UDM in a P-Mav-Dest-Host header of the SIP 401 message. S-CSCF 633 transfers the SIP 401 message to I-CSCF 632. I-CSCF 632 forwards the SIP 401 message to P-CSCF 631. P-CSCF 631 removes and caches the cipher key and the integrity key from the SIP 401 message. P-CSFC 631 transfers the SIP 401 message to UPF 623. The remaining authentication data in the SIP 401 message comprises the random number and the authentication token. UPF 623 transfers the SIP 401 message to the SDAP in CU 613. The SDAP in CU 613 transfers the SIP 401 message to the SDAP in UE 601 over the PDCPs, RLCs, MACs, and PHYs. The SDAP in UE 601 indicates the SIP 401 message to the RRC in UE 601. The RRC in UE 601 verifies the authentication token for IMS core 630 and uses the random number received in the SIP 401 message to generate an authentication response. P-CSCF 631 establishes a secure signaling channel with UE 601 using the ciphering and integrity keys.

In response to the SIP 401 message, the RRC in UE 601 drives the SIP application to generate a second SIP registration request. The SDAP in UE 601 inserts the network address for the UDM in the P-Mav-Dest-Host header of the second SIP registration request. The SDAP includes the authentication response in the second SIP registration message and transfers the second SIP registration message to the SDAP in CU 613 over the PDCPs, RLCs, MACs, and PHYs. The SDAP in CU 613 transfers the second SIP registration request to UPF 623. UPF 623 transfers the second SIP registration request to P-CSCF 631.

P-CSCF 631 receives the second SIP registration request from UPF 623. P-CSCF 631 and forwards the second registration request to I-CSCF 632. I-CSCF 632 reads the network address in the P-Mav-Dest-Host header of the second SIP registration request. I-CSCF 632 generates a second UAR and transfers the UAR to the same UDM using the network address in the P-Mav-Dest-Host header. The UDM receives the UAR and transfers a UAA indicating the S-CSCFs and the network address for the UDM to I-CSCF 632. I-CSCF 632 receives the UAA and selects S-CSCF 633. I-CSCF 632 forwards the second SIP registration request with the network address for the UDM and the authentication response generated by UE 601 to S-CSCF 633.

S-CSCF 633 receives the second SIP registration request and reads the P-Mav-Dest-Host header to determine the network address of the UDM used by I-CSCF 632. S-CSCF 633 generates a SAR and transfers the SAR for delivery to the same UDM based on the network address. The UDM receives the SAR and accesses a subscriber profile for UE 601 to retrieve the subscriber data. The UDM transfers an SAA that includes the subscriber data to S-CSCF 633. S-CSCF 633 matches an expected result for the authentication challenge to the authentication response generated by UE 601 to authenticate the identity of UE 601. S-CSCF 633 registers UE 601 for IMS service based on the authentication. S-CSCF 633 generates a SIP 200 message to acknowledge the registration. S-CSCF 633 includes the network for the UDM in a P-Mav-Dest-Host header of the SIP 200 message. S-CSCF 633 transfers the SIP 200 message to I-CSCF 632. I-CSCF 632 forwards the SIP 200 message to P-CSCF 631. P-CSFC 631 transfers the SIP 200 message to UPF 623. UPF 623 transfers the SIP 200 message to the SDAP in CU 613. The SDAP in CU 613 transfers the SIP 200 message to the SDAP in UE 601 over the PDCPs, RLCs, MACs, and PHYs.

Once registered, UE 601 initiates a MO IMS voice session in response to user input. The RRC in UE 601 controls the SIP application to generate a SIP invite message and addresses the message for delivery to P-CSCF 631. The SDAP in UE 601 transfers the SIP invite to the SDAP in CU 613 over PDCPs, RLCs, MACs, and PHYs. The SDAP in CU 613 transfers the SIP invite to UPF 623. UPF 623 forwards the SIP invite message to P-CSCF 631. P-CSCF 631 receives the SIP invite and in response, interfaces with I-CSCF 632 and S-CSCF 633 to deliver the SIP invite. S-CSCF 633 interacts with I-CSCF 632 and TAS 634 to set select a message destination for the MO IMS session based on the SIP invite. S-CSCF 633 transfers the SIP invite to the application server (AS) in data network 641. The application server accepts the SIP invite. S-CSCF 633 indicates the acceptance to UPF 623. UPF 623 transfers the indication to the SDAP in CU 613. The SDAP in CU 613 transfers the acceptance to the SDAP in UE 601 over the PDCPs, RLCs, MACs, and PHYs. The SDAP in UE 601 exchanges user data for the MO IMS voice session with the SDAP in CU 613. The SDAP in CU 613 exchanges the user data for the MO IMS voice session with UPF 623. UPF 623 exchanges the user data for the MO IMS voice session with the application server in data network 641.

The wireless data network circuitry described above comprises computer hardware and software that form special-purpose network circuitry to register wireless user devices with multimedia systems like an IMS core. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to register wireless user devices with multimedia systems like an IMS core.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to register user devices with a multimedia system, the method comprising:
a first multimedia function receiving a registration request for a wireless user device, selecting a subscriber server from a plurality of available subscriber servers, and transferring a user authorization request for the wireless user device to the subscriber server;
the subscriber server receiving the user authorization request and transferring a response indicating a server Identifier (ID) for the subscriber server to the first multimedia function;
the first multimedia function receiving the response and indicating the registration request and the server ID to a second multimedia function; and
the second multimedia function receiving the response, selecting the subscriber server of the plurality of available subscriber servers based on the server ID, and transferring a multimedia authorization request to the subscriber server.

2. The method of claim 1 further comprising:
the subscriber server receiving the multimedia authorization request and transferring another response indicating user authorization data to the second multimedia function; and
the second multimedia function receiving the other response and indicating the user authorization data for delivery to the wireless user device.

3. The method of claim 2 further comprising:
the second multimedia function forwarding the server ID towards an Application Server (AS) for Third-Party Registration (TPR).

4. The method of claim 1 wherein the first multimedia function comprises an Interrogating Call State Control Function (I-CSCF).

5. The method of claim 1 wherein the second multimedia function comprises a Serving Call State Control Function (S-CSCF).

6. The method of claim 1 wherein:
the subscriber server comprises a Home Subscriber Server (HSS); and
the plurality of available subscriber servers comprises a plurality of available HSSs.

7. The method of claim 1 wherein:
the subscriber server comprises a Unified Data Management (UDM); and
the plurality of available subscriber servers comprises a plurality of available UDMs.

8. A wireless communication network to register user devices with a multimedia system, the wireless communication network comprising:
a first multimedia function configured to receive a registration request for a wireless user device, select a subscriber server from a plurality of available subscriber servers, and transfer a user authorization request for the wireless user device to the subscriber server;

the subscriber server configured to receive the user authorization request and transfer a response indicating a server Identifier (ID) for the subscriber server to the first multimedia function;

the first multimedia function configured to receive the response and indicate the registration request and the server ID to a second multimedia function; and the second multimedia function configured to receive the registration request and the server ID, select the subscriber server of the plurality of available subscriber servers based on the server ID, and transfer a multimedia authorization request to the subscriber server.

9. The wireless communication network of claim 8 further comprising:

the subscriber server configured to receive the multimedia authorization request and transfer another response indicating user authorization data to the second multimedia function; and the second multimedia function configured to receive the other response and indicate the user authorization data for delivery to the wireless user device.

10. The wireless communication network of claim 9 further comprising:

the second multimedia function configured to forward the server ID towards an Application Server (AS) for Third-Party Registration (TPR).

11. The wireless communication network of claim 8 wherein the first multimedia function comprises an Interrogating Call State Control Function (I-CSCF).

12. The wireless communication network of claim 8 wherein the second multimedia function comprises a Serving Call State Control Function (S-CSCF).

13. The wireless communication network of claim 8 wherein:

the subscriber server comprises a Home Subscriber Server (HSS); and the plurality of available subscriber servers comprises a plurality of available HSSs.

14. The wireless communication network of claim 8 wherein:

the subscriber server comprises a Unified Data Management (UDM); and the plurality of available subscriber servers comprises a plurality of available UDMs.

15. A method of operating a wireless communication network to register user devices with an Internet Protocol Multimedia Subsystem (IMS) core, the method comprising:

an Interrogating Call State Control Function (I-CSCF) receiving a registration request for a wireless user device from a Proxy Call State Control Function (P-CSCF) and transferring a user authorization request for the wireless user device to a Unified Data Management (UDM) of a plurality of available UDMs;

the UDM receiving the user authorization request and transferring a user authorization answer comprising a network address for the UDM and Serving Call State Control Functions (S-CSCFs) data indicating available S-CSCFs to the I-CSCF;

the I-CSCF receiving the user authorization answer, selecting an S-CSCF of the available S-CSCFs, and forwarding the registration request and the network address to the S-CSCF;

the S-CSCF receiving the registration request and the network address, selecting the UDM of the plurality of available UDMs based on the network address, and transferring a multimedia authorization request to the UDM.

16. The method of claim 15 further comprising:

the UDM receiving the multimedia authorization request and transferring a multimedia authentication answer indicating available authentication vectors to authenticate the wireless user device to the S-CSCF; and the S-CSCF receiving the multimedia authentication answer, selecting an authentication vector from the available authentication vectors, generating an authentication challenge, and forwarding the authentication challenge to the P-CSCF for delivery to the wireless user device wherein the P-CSCF interfaces with the wireless user device to authenticate the wireless user device using the authentication challenge.

17. The method of claim 16 wherein the S-CSCF forwarding the authentication challenge to the P-CSCF for delivery to the wireless user device comprises forwarding a Session Initiation Protocol (SIP) 401 message to the P-CSCF for delivery to the wireless user device.

18. The method of claim 16 further comprising:

the Interrogating Call State Control Function (I-CSCF) receiving a second registration request for the wireless user device from the P-CSCF and transferring a second user authorization request for the wireless user device to the UDM of a plurality of available UDMs;

the UDM receiving the second user authorization request and transferring a second user authorization answer comprising the network address for the UDM and the S-CSCF data indicating the available S-CSCFs to the I-CSCF;

the I-CSCF receiving the second user authorization answer, selecting the S-CSCF of the available S-CSCFs, and forwarding the second registration request and the network address to the S-CSCF;

the S-CSCF receiving the second registration request and the network address, selecting the UDM of the plurality of available UDMs based on the network address, and transferring a server assignment request to the UDM.

19. The method of claim 18 further comprising:

the UDM receiving the server assignment request from the S-CSCF and transferring a server assignment answer that indicates subscriber information to the S-CSCF; and the S-CSCF receiving the server assignment answer, registering the wireless user device based on the second registration request and the subscriber information, and indicating the registration to the P-CSCF wherein the P-CSCF indicates the registration to the wireless user device.

20. The method of claim 19 wherein the S-CSCF indicating the registration to the P-CSCF comprises transferring a Session Initiation Protocol (SIP) 200 message to the P-CSCF for delivery to the wireless user device.

* * * * *